(12) United States Patent
Hung et al.

(10) Patent No.: US 11,005,154 B2
(45) Date of Patent: May 11, 2021

(54) ANTENNAS IN FRAMES FOR DISPLAY PANELS

(71) Applicant: Hewlett-Packard Development Company, L.P., Spring, TX (US)

(72) Inventors: Kuan-Jung Hung, Taipei (TW); Chun-Chih Liu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/603,612

(22) PCT Filed: Apr. 11, 2017

(86) PCT No.: PCT/US2017/027008
§ 371 (c)(1),
(2) Date: Oct. 8, 2019

(87) PCT Pub. No.: WO2018/190808
PCT Pub. Date: Oct. 18, 2018

(65) Prior Publication Data
US 2020/0136230 A1    Apr. 30, 2020

(51) Int. Cl.
| | | |
|---|---|---|
| *H01Q 1/22* | (2006.01) | |
| *H01Q 7/00* | (2006.01) | |
| *H01Q 5/385* | (2015.01) | |
| *G06F 1/16* | (2006.01) | |

(Continued)

(52) U.S. Cl.
CPC ......... *H01Q 1/2266* (2013.01); *G06F 1/1681* (2013.01); *H01Q 1/48* (2013.01); *H01Q 5/385* (2015.01); *H01Q 7/00* (2013.01); *H01Q 9/42* (2013.01)

(58) Field of Classification Search
CPC ...... H01Q 1/2258; H01Q 1/2266; H01Q 1/48; H01Q 5/385; H01Q 7/00; H01Q 9/42; H01Q 1/22
See application file for complete search history.

(56) References Cited

U.S. PATENT DOCUMENTS

| | | | |
|---|---|---|---|
| 5,048,118 A | * | 9/1991 | Brooks ............... G02F 1/13452 455/156.1 |
| 7,541,993 B2 | | 6/2009 | Tsai et al. |
| 7,969,371 B2 | | 6/2011 | Yun et al. |

(Continued)

FOREIGN PATENT DOCUMENTS

| | | |
|---|---|---|
| CN | 101048946 | 10/2007 |
| CN | 102043438 | 5/2011 |

(Continued)

OTHER PUBLICATIONS

Chiu, C.W. et al., A Meandered Loop Antenna for LTE/WWAN Operations in a Smart Phone, 2010.

(Continued)

*Primary Examiner* — Hoang V Nguyen
(74) *Attorney, Agent, or Firm* — HPI Patent Department

(57) ABSTRACT

The present subject matter describes positioning of an antenna inside a frame for a display panel of an electronic device. The antenna comprises a ground plate extending along a side of the frame, a substrate positioned on the ground plate, and two loop antenna elements formed on the substrate, both ends of each of the two loop antenna elements being connected to the ground plate.

15 Claims, 8 Drawing Sheets

(51) Int. Cl.
   *H01Q 1/48* (2006.01)
   *H01Q 9/42* (2006.01)

(56) References Cited

U.S. PATENT DOCUMENTS

| | | |
|---|---|---|
| 9,293,806 B2 | 3/2016 | Kwong et al. |
| 9,325,070 B1 | 4/2016 | Obeidat et al. |
| 2002/0190905 A1* | 12/2002 | Flint ................ H01Q 9/42 343/702 |
| 2007/0285321 A1 | 12/2007 | Chung et al. |
| 2013/0083497 A1* | 4/2013 | Lee .................. H05K 1/0243 361/749 |
| 2014/0097997 A1 | 4/2014 | Chang |
| 2014/0292613 A1 | 10/2014 | Hsiao et al. |
| 2015/0048991 A1 | 2/2015 | Pajona et al. |
| 2015/0054693 A1 | 2/2015 | Lin |
| 2015/0303568 A1 | 10/2015 | Yarga et al. |
| 2016/0190709 A1* | 6/2016 | Niu ................ H01Q 21/28 343/725 |
| 2016/0315373 A1 | 10/2016 | Azad et al. |

FOREIGN PATENT DOCUMENTS

| | | |
|---|---|---|
| GB | 2542257 | 3/2017 |
| KR | 20090032157 | 4/2009 |
| TW | 454040 | 5/2013 |
| WO | WO-2017017429 A1 | 2/2017 |

OTHER PUBLICATIONS

Chiu, C-W., et al., Printed Loop Antenna with a U-shaped Tuning Element for Hepta-band Laptop Applications, Nov. 2010.

Kin-Lu Wong et al. Zhi-Hua Feng. On-frame dual-loop antenna with narrow ground clearance for the 2,4/5,2/5,8-GHz WLAN operation in the smartphone. Microwave and optical technology letters, vol. 58, No. 6, Jun. 2016, pp. 1480-1485, Sections 2-5.

* cited by examiner

ANTENNAS IN FRAMES FOR DISPLAY PANELS

BACKGROUND

Electronic devices, such as laptops and cellular phones, include antennas for wireless communication. Such antennas may be mounted in an enclosure or housing of the electronic device. The antennas have wireless communication capabilities to communicate with wireless networks and satellite navigation systems.

BRIEF DESCRIPTION OF DRAWINGS

The following detailed description references the drawings, wherein.

DETAILED DESCRIPTION

Figure 1:
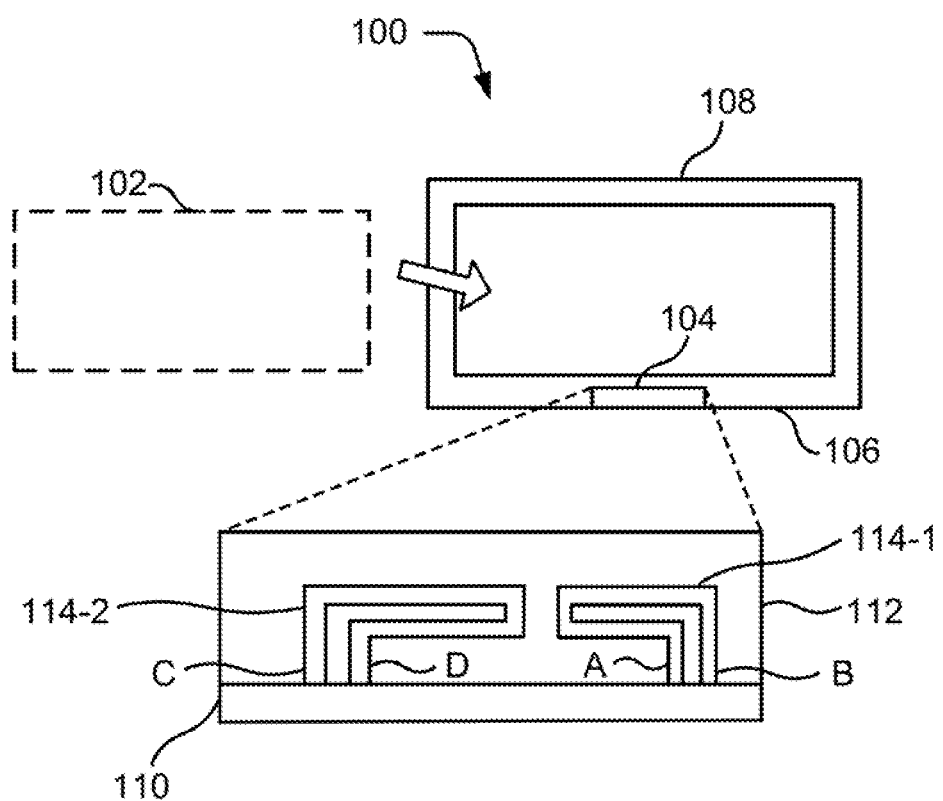
FIG. 1 illustrates a frame for a display panel of an electronic device, according to an example implementation of the present subject matter.

Electronic devices have an enclosure in which electronic components, such as a processor, a memory, a power source, a cooling fan, an I/O port, or the like, are housed. Electronic devices also include a display unit for rendering visual output. The enclosure may be coupled to the display unit through a coupling element, such as a hinge. In an example, the electronic device may be a laptop having a keyboard in the enclosure and a display panel in the display unit.

As the enclosure houses a wide variety of electronic components, the enclosure is space constrained. A wireless antenna is generally mounted within the enclosure along with the other electronic components. While positioning the antenna in the enclosure, certain pre-defined clearances are to be maintained between the antenna and other electronic components so that radiations from the antenna do not interfere with functioning of the other components. Positioning the antenna within the enclosure may also result in increase in specific absorption rate (SAR) associated with the radiations from the antenna at the bottom part of the enclosure. This may result in over heating of the bottom part of the enclosure of the electronic device.

The enclosure may have some portions made of metal. Antennas are generally mounted in a slot provided within the metal portion of the enclosure. The slot for the antenna, also called an antenna window, may be a cut-out in the metal portion. The antenna is placed in the slot and then the slot is covered with a plastic filling member. The radiations from the antenna are transmitted through walls of the plastic filling member. The plastic filling member is then coated with metal-finish paints in order to give the plastic filling member an appearance similar to the surrounding metal portion of the enclosure. Cutting a slot in the metal portion, positioning the antenna in the slot, covering the slot with the plastic filling member, and coating the plastic filling member with metal-finish paints involves additional material cost of the plastic filling member and the metal-finish paints and also involves additional production steps and production time.

The present subject matter relates to positioning antennas in a frame for a display panel of an electronic device. The frame and the display panel form part of the display unit of the electronic device. As the antenna is positioned in the frame for the display panel, challenges associated with placing the antenna in the space constrained enclosure are eliminated. Positioning of the antenna in the frame also reduces the SAR on the bottom part of the enclosure and may reduce over heating of the enclosure of the electronic device. Further, with the antenna positioned in the frame, as the antenna is away from the other electronic components housed in the enclosure, chances of radiations from the antenna interfering with functioning of the other electronic components in the enclosure may be reduced. In addition, cutting of antenna windows in the enclosure may be avoided. This reduces the number of production steps, production time, and facilitates in eliminating use of additional plastic filling members and metallic paints on the plastic filling members, thereby reducing complexity and costs of assembling processes.

According to an example implementation of the present subject matter, an antenna, positioned inside the frame, includes a ground plate extending along a side of the frame, a substrate positioned on the ground plate, and two loop antenna elements formed on the substrate. Both ends of each of the two loop antenna elements are grounded.

The arrangement of the two loop antenna elements on the substrate facilitate in obtaining a compact antenna which can be accommodated in the frame without compromise on bandwidth specifications of the antenna. In an example implementation, one of the two loop antenna elements may be tuned to operate in 2.4 Giga Hertz frequency band and the other of the two loop antenna elements may be tuned to operate in 5 Giga Hertz frequency band. Thus, the antenna positioned in the frame can be operated as a dual-band antenna which can reliably receive signals over a wireless Local Area Network (WLAN). Further, in an example implementation, the antenna may also be operated as a single-band antenna to receive Global Navigation Satellite System (GNSS) signals which may have a frequency ranging between 1561 Mega Hertz to 1602 Mega Hertz to cover the frequency bands for GPS L1, Glonass G1, BDS B1, and Galileo E1. The dual loop structure of the antenna facilitates in operating the antenna over the wide frequency range of the GNSS.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a frame 100 for a display panel 102 of an electronic device, according to an example implementation of the present subject matter. The display panel 102 may be, for example, a liquid crystal display (LCD) panel or a light emitting diode (LED) panel for rendering visual output of the electronic device. In an example implementation, the display panel 102 may include a touchscreen for receiving touch-based inputs from a user.

In an example implementation, the frame 100 bordering the display panel 102 may be formed from metal and may include a slot (not shown) for mounting of the display panel 102 in the frame 100. The frame 100 may be covered by a plastic casing (not shown).

The frame 100 includes an antenna 104 positioned inside the frame 100 along a first side 106 of the frame 100, as shown in FIG. 1. The first side 106 is a side of the frame 100 through which the frame 100 is couplable to a base unit of the electronic device, as illustrated later through FIG. 9. In an example implementation, coupling elements, such as hinges may be secured to the first side 106 for attaching the frame 100 to the base unit. The base unit may house a keyboard and other electronic components, such as a processor, a memory, a power source, etc. of the electronic device. Although in FIG. 1, the antenna 104 is shown to be positioned along the first side 106 of the frame 100, in an example implementation, the antenna 104 may also be positioned along a second side 108 of the frame 100 opposite to the first side 106. Further, although FIG. 1 shows a single antenna positioned inside the frame 100, there may be two antennas or more than two antennas positioned inside the frame 100.

FIG. 1 illustrates the antenna 104 through a magnified view. As can be seen from the magnified view in FIG. 1, the antenna 104 includes a ground plate 110 extending along the first side 106 of the frame 100. In an example implementation, the frame 100 includes a metal portion (not shown) along the first side 106. The metal portion is for providing structural stability and durability to the frame 100 and is also used as an electrical ground for the electrical circuitry housed within the frame 100. In an example implementation, the ground plate 110 may be formed at an edge of the metal portion along the first side 106 of the frame 100.

The antenna 104 also includes a substrate 112 positioned on the ground plate 110. The substrate 112 may be formed of a di-electric material, such as plastic, ceramic, glass or a combination thereof. The antenna 104 includes two loop antenna elements formed on the substrate 112 where both ends of each of the two loop antenna elements are connected to the ground plate 110. The two loop antenna elements are formed on a surface of the substrate 112. The surface of the substrate 112 on which the two loop antenna elements are formed may be referred to as an excitation surface (depicted later through FIG. 2). Radiations from the antenna 104 are emitted out from the excitation surface.

The excitation surface of the substrate 112 faces the first side 106, to transceive wireless antenna signals. The excitation surface of the substrate 112 is aligned inside the frame 100, such that radiations from the excitation surface are emitted out through a front surface (depicted later through FIG. 9) of the first side 106. The front surface of the first side 106 may be understood to be extending along a front surface of the display panel 102 on which a display is generated.

FIG. 1 shows a first loop antenna element 114-1 and a second loop antenna element 114-2 formed on the substrate 112. The first loop antenna element 114-1 has two ends A and B which are connected to the ground plate 110 for being grounded. The second loop antenna element 114-2 has two ends, C and D, which are also connected to the ground plate 110 for being grounded. In an example implementation, ends A, B, C, and D may be soldered to the ground plate 110.

In an example implementation, the first and second loop antenna elements, 114-1 and 114-2, may be formed of metallic micro-strips deposited on the excitation surface of the substrate 112. The metallic micro-strips can be formed on the substrate 112 through electroplating using metal foils or other metal deposition techniques. In an example implementation, the first loop antenna element 114-1 may be tuned to operate in 2.4 Giga Hertz frequency band and the second loop antenna element 114-2 may be tuned to operate in 5 Giga Hertz frequency band and vice versa. In an example implementation, the antenna 104 may be operated as a dual-band antenna to receive WLAN signals in 2.4 Giga Hertz frequency band and 5 Giga Hertz frequency band. In another example implementation, the antenna 104 may be operated as a single-band antenna to receive GNSS signals in a range of 1561 Mega Hertz to 1602 Mega Hertz to cover the frequency bands for GPS L1, Glonass G1, BDS B1I, and Galileo E1.

Figure 2:
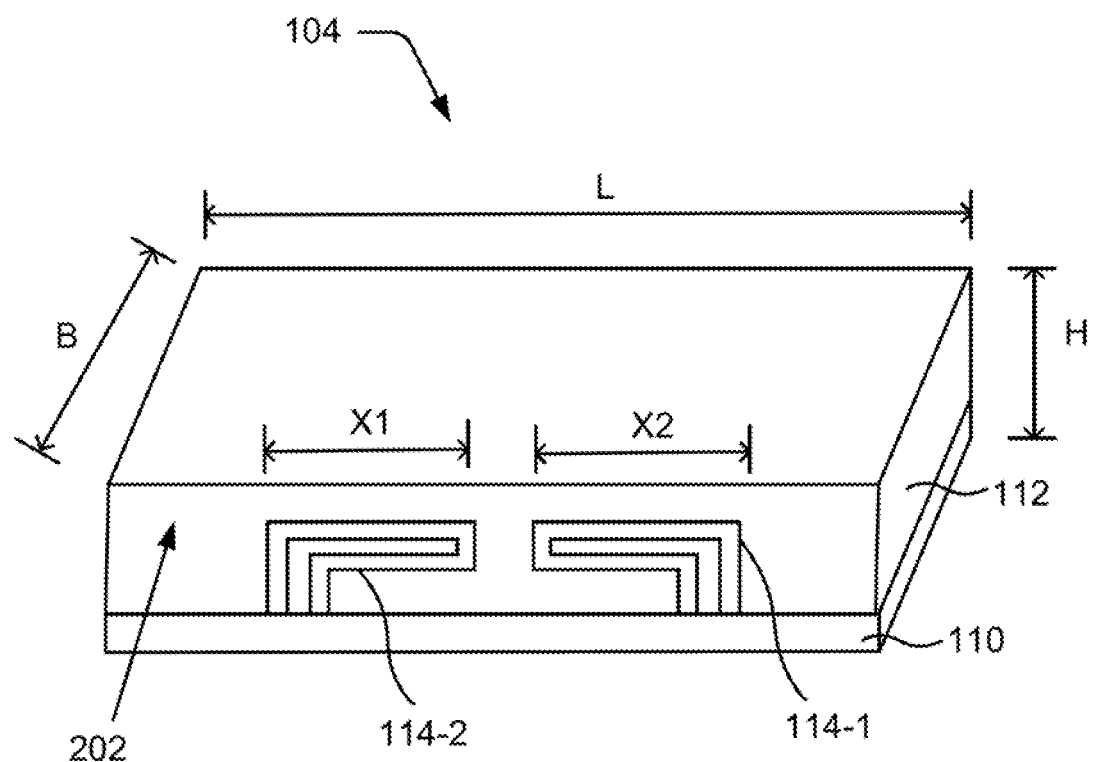
FIG. 2 illustrates a perspective view of an antenna, according to an example implementation of the present subject matter.

FIG. 2 illustrates a perspective view of the antenna 104 of FIG. 1, according to an example implementation of the present subject matter. The antenna 104, as shown in FIG. 2, has a length L, a breadth B, and a height H. In an example implementation, the length 'L' ranges between about 40 mm to about 50 mm, the breadth 'B' ranges between about 8 mm to about 10 mm, and the height 'H' ranges between about 2.5 mm to about 3.5 mm. As shown in FIG. 2, the substrate 112 of the antenna 104 has a cuboidal structure with an excitation surface 202. The first loop antenna element 114-1 and the second loop antenna element 114-2 are formed on the excitation surface 202. As shown in FIG. 2, the first loop antenna element 114-1 has a length X1 and the second loop antenna element 114-2 has a length X2. In an example implementation, X1 and X2 may range between about 10 mm to 20 mm. In an example implementation, the first and second loop antenna elements, 114-1 and 114-2, may have equal lengths.

Figure 3:
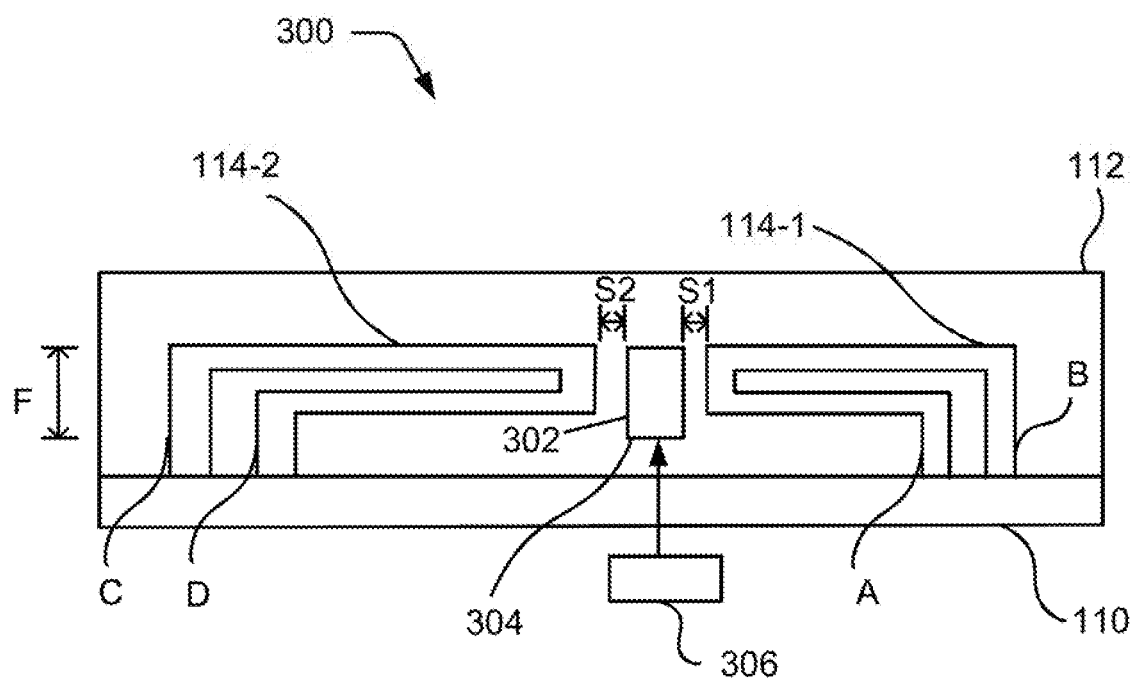
FIG. 3 illustrates a front view of an excitation surface of an antenna, according to an example implementation of the present subject matter.

FIG. 3 illustrates a front view of an excitation surface of an antenna 300, according to an example implementation of the present subject matter. The antenna 300 is similar to the antenna 104 of FIG. 1 and includes the components and features of the antenna 104. Referring to FIG. 3, the antenna 300 includes a feeding monopole 302 formed on the excitation surface of the substrate 112, between the first loop antenna element 114-1 and the second loop antenna element 114-2. The feeding monopole 302 is formed from metal through electroplating on the substrate 112. The feeding monopole 302 has an end 304 facing the ground plate 110.

In an example implementation, a feed signal source 306 is coupled to the end 304 of the feeding monopole 302. A positive terminal of the feed signal source 306 may be connected to the end 304 of the feeding monopole 302 and a negative or ground terminal of the feed signal source 306 may be connected to the ground plate 110.

In an example implementation, the feeding monopole 302 has a length 'F' of about 1 mm to about 2 mm. In an example implementation, distance 'S1' between the feeding monopole 302 and the first loop antenna element 114-1 is about 0.5 mm. The distance 'S2' between the feeding monopole 302 and the second loop antenna element 114-2 is also about 0.5 mm.

Referring to FIG. 3, ends A and B of the first loop antenna element 114-1 are connected to the ground plate 110 on one side of the feeding monopole 302. Ends C and D of the second loop antenna element 114-2 are connected to the ground plate 110 on the other side of the feeding monopole 302.

In an example implementation, the antenna 300 may include one parasitic monopole or more than one parasitic monopole formed on the substrate 112. The parasitic monopole may have an end connected to the ground plate, between the feeding monopole and one of the two loop antenna elements, where the parasitic monopole extends in a direction away from the feeding monopole and towards ends of the one of the two loop antenna elements. In another example implementation, the parasitic monopole may have an end connected to the ground plate, between the feeding monopole and one of the two loop antenna elements, where the parasitic monopole extends in a direction away from ends of the one of the two loop antenna elements and towards the feeding monopole.

Figure 4:
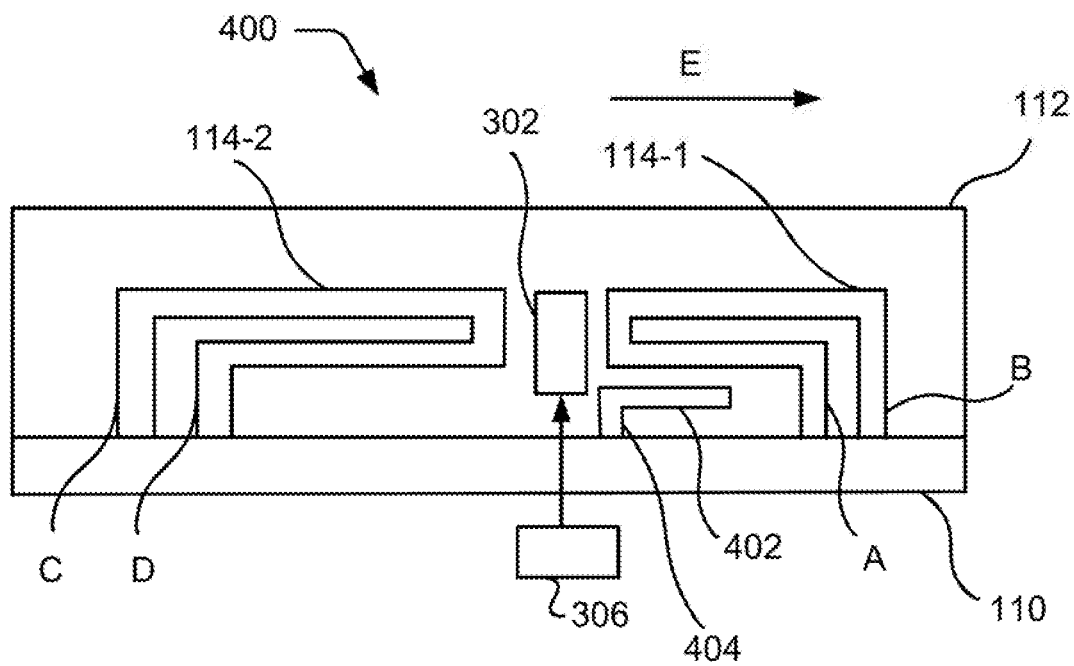
FIG. 4 illustrates a front view of an excitation surface of an antenna with a parasitic monopole formed on the excitation surface, according to an example implementation of the present subject matter.

FIG. 4 illustrates a front view of an excitation surface of an antenna 400 with a parasitic monopole formed on the excitation surface, according to an example implementation of the present subject matter. The antenna 400 is similar to the antenna 300 of FIG. 3 and includes the components and features of the antenna 300. The antenna 400 further includes a parasitic monopole 402 formed on the substrate.

As shown in FIG. 4, the parasitic monopole 402 is formed on the substrate 212. The parasitic monopole 402 has an end 404 connected to the ground plate 110, between the feeding monopole 302 and the first loop antenna element 114-1. As shown in FIG. 4, the parasitic monopole 402 extends in a direction, of arrow 'E', away from the feeding monopole 302 and towards the two ends, A and B, of the first loop antenna element 114-1. In an example implementation, the parasitic monopole may be formed between the feeding monopole and the second loop antenna element and may extend in a direction away from the feeding monopole and towards the ends of the second loop antenna element.

In an example implementation, the first and second loop antenna elements 114-1 and 114-2 may be tuned to operate in 2.4 Giga Hertz frequency band and the parasitic monopole 402 may be tuned to operate in 5 Giga Hertz frequency band.

Figure 5:
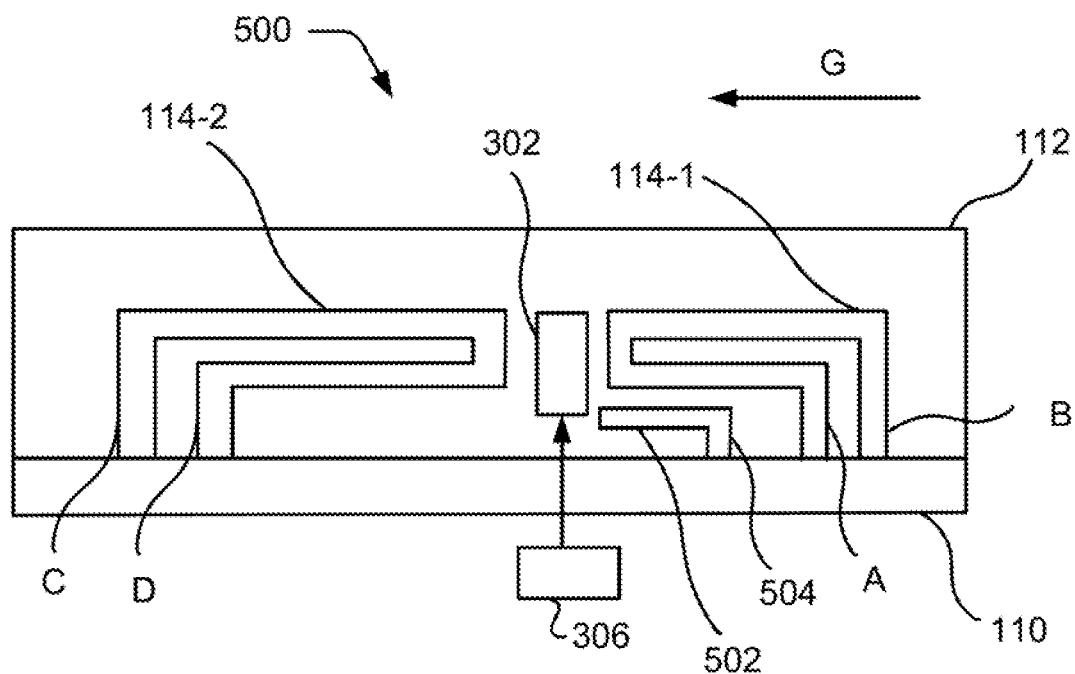
FIG. 5 illustrates a front view of an excitation surface of an antenna with a parasitic monopole formed on the excitation surface, according to another example implementation of the present subject matter.

FIG. 5 illustrates a front view of an excitation surface of an antenna 500 with a parasitic monopole formed on the excitation surface, according to another example implementation of the present subject matter. The antenna 500 is similar to the antenna 300 of FIG. 3 and includes the components and features of the antenna 300. The antenna 500 further includes a parasitic monopole 502 formed on the substrate 112.

As shown in FIG. 5, the parasitic monopole 502 has an end 504 connected to the ground plate 110, between the feeding monopole 302 and the first loop antenna element 114-1. As shown in FIG. 5, the parasitic monopole 502 extends in a direction, of arrow 'G', away from the two ends, A and B, of the first loop antenna element 114-1 and towards the feeding monopole 302. In an example implementation, the parasitic monopole may be formed between the feeding monopole and the second loop antenna element and may extend in a direction away from the ends of the second loop antenna element and towards the feeding monopole.

In an example implementation, the first and second loop antenna elements 114-1 and 114-2 may be tuned to operate in 2.4 Giga Hertz frequency band and the parasitic monopole 502 may be tuned to operate in 5 Giga Hertz frequency band.

Figure 6:
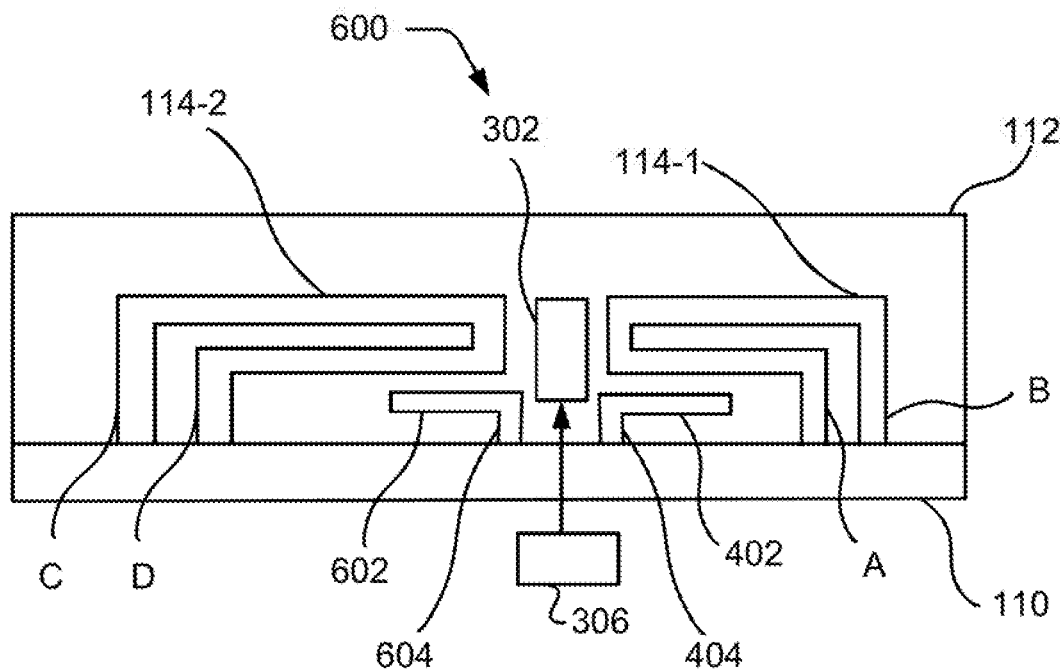
FIG. 6 illustrates a front view of an excitation surface of an antenna with two parasitic monopoles formed on the excitation surface, according to an example implementation of the present subject matter.

FIG. 6 illustrates a front view of an excitation surface of an antenna 600 with two parasitic monopoles formed on the excitation surface, according to an example implementation of the present subject matter. The antenna 600 is similar to the antenna 400 of FIG. 4 and includes the parasitic monopole 402. With reference to FIG. 6, the parasitic monopole 402 may be referred to as a first parasitic monopole 402. The antenna 600 also includes a second parasitic monopole 602 formed on the substrate 112 between the feeding monopole 302 and the second loop antenna element 114-2. The second parasitic monopole 602 has an end 604 connected to the ground plate 110, between the feeding monopole 302 and the second loop antenna element 114-2. The second parasitic monopole 602 extends in a direction away from the feeding monopole 302 and towards the two ends, C and D, of the second loop antenna element 114-2. In an example implementation, the first and second loop antenna elements 114-1 and 114-2 may be tuned to operate in 2.4 Giga Hertz frequency band and the first and second parasitic monopoles 402 and 602 may be tuned to operate in 5 Giga Hertz frequency band.

Figure 7:
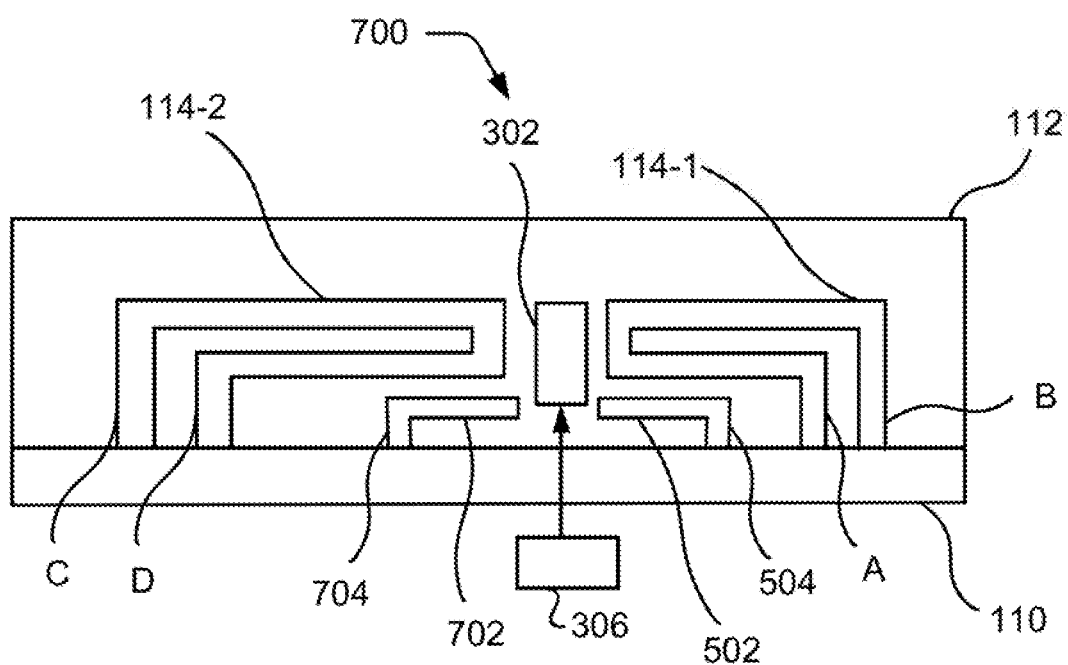
FIG. 7 illustrates a front view of an excitation surface of an antenna with two parasitic monopoles formed on the excitation surface, according to another example implementation of the present subject matter.

FIG. 7 illustrates a front view of an excitation surface of an antenna 700 with two parasitic monopoles formed on the excitation surface, according to another example implementation of the present subject matter. The antenna 700 is similar to the antenna 500 of FIG. 5 and includes the parasitic monopole 502. With reference to FIG. 7, the parasitic monopole 502 may be referred to as a first parasitic monopole 502. The antenna 700 also includes a second parasitic monopole 702 formed on the substrate 112 between the feeding monopole 302 and the second loop antenna element 114-2. The second parasitic monopole 702 has an end 704 connected to the ground plate 110, between the feeding monopole 302 and the second loop antenna element 114-2. The second parasitic monopole 702 extends in a direction away from the two ends. C and D, of the second loop antenna element 114-2 and towards the feeding monopole 302. In an example implementation, the first and second loop antenna elements 114-1 and 114-2 may be tuned to operate in 2.4 Giga Hertz frequency band and the first and second parasitic monopoles 502 and 702 may be tuned to operate in 5 Giga Hertz frequency band.

Figure 8:
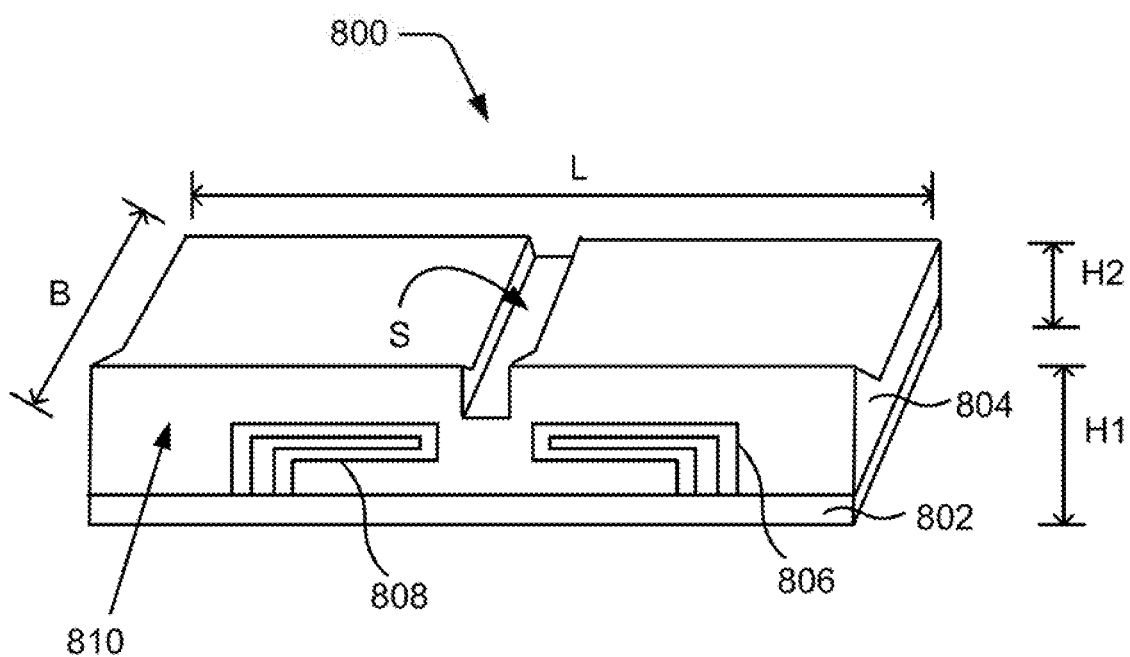
FIG. 8 illustrates a perspective view of an antenna, according to an example implementation of the present subject matter.

FIG. 8 illustrates a perspective view of an antenna 800, according to an example implementation of the present subject matter. The antenna 800 can be positioned inside a frame, such as the frame 100 as illustrated in FIG. 1. The antenna 800 includes a ground plate 802 similar to that of antenna 104 illustrated in FIG. 1. The antenna 800 also includes a substrate 804 positioned on the ground plate 802. The substrate 804 can be formed of similar materials as that of substrate 112 illustrated in FIG. 1. Two loop antenna elements 806 and 808 are formed on a surface 810 the substrate 804. The surface 810 may be referred to as an excitation surface 810 of the substrate 804. Radiations from the antenna 800 are emitted out from the excitation surface 810. The loop antenna elements 806 and 808 are similar to the loop antenna elements 114-1 and 114-2 illustrated in FIG. 1.

As shown in FIG. 8, the substrate 804 includes a slot S. The slot S may allow passage of electrical connections or wires for connecting antenna feed elements (not shown in FIG. 8) which may be formed on the excitation surface 810 to a power source (not shown in FIG. 8). The substrate 804 illustrated in FIG. 8 has a length 'L' and breadth 'B' similar to that of the substrate 112 of FIG. 1. However, the substrate 804 of FIG. 8 has a varying height. The excitation surface 810 of the substrate 804 has a height 'H1' and the surface opposite to the excitation surface 810 has a height 'H2', where 'H1' is greater than 'H2'. In an example implementation, 'H1' is about 3.5 mm and 'H2' is about 2.5 mm.

The configuration of the antenna 800, as illustrated in FIG. 8, provides adequate space on the excitation surface 810 for forming the first loop antenna element 806, the second loop antenna element 808, and other antenna elements. At the same time, the reduced height of the surface opposite to the excitation surface 810 allows in reduction of the volume of the substrate 804 and thereby forms a compact antenna 800. This allows the antenna 800 to be easily accommodated within the frame for the display panel of the electronic device.

Figure 9:
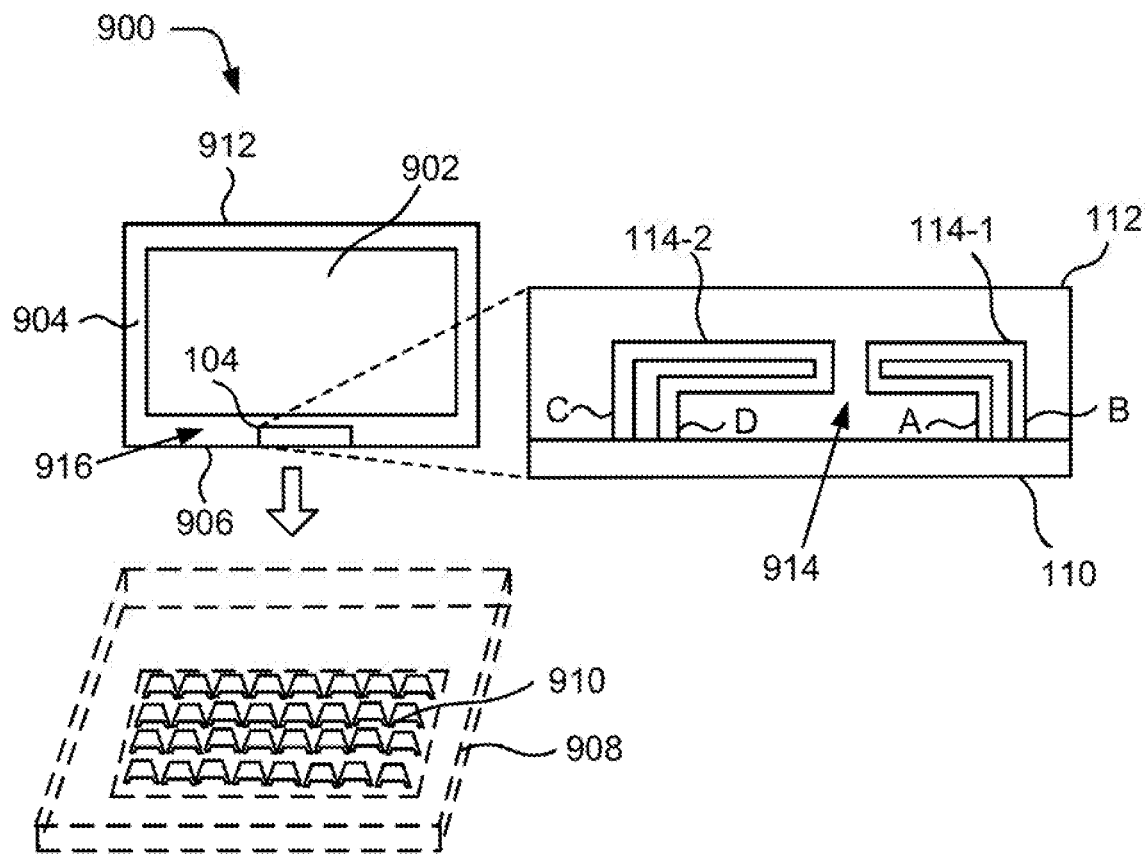
FIG. 9 illustrates a display unit of an electronic device, according to an example implementation of the present subject matter.

FIG. 9 illustrates a display unit 900 of an electronic device, according to an example implementation of the present subject matter. The display unit 900 includes a display panel 902. The display panel 902 may be similar to that as described for FIG. 1. The display unit 900 also includes a frame 904 bordering the display panel 902. The frame 904 is similar to that illustrated in FIG. 1. The display unit 900 further includes the antenna 104, as illustrated in FIG. 1, positioned, inside the frame 904, along a first side 906 of the frame 904. The first side 906 is a side through which the frame 904 is couplable to a base unit 908 of the electronic device. The base unit 908 houses a keyboard 910 and encloses a processor, a memory, an I/O port, etc., of the electronic device. In an example implementation, the antenna 104 may also be positioned along a second side 912 of the frame 904, opposite to the first side 906.

As depicted in FIG. 9, the antenna 104 has a ground plate 110 extending in a direction along the first side 906. A substrate 112 is positioned on the ground plate 110. A first loop antenna element 114-1 and a second loop antenna element 114-2 are formed on a surface 914 of the substrate 212 which faces the first side 906. The surface 914 may be referred to as an excitation surface 914. Radiations from the excitation surface 914 are emitted out through a front surface 916 of the first side 906. The front surface 916 of the first side 106 may be understood to be extending along a front surface of the display unit 900 on which a display is generated. Two ends, A and B, of the first loop antenna element 114-1 are connected to the ground plate 110 and two ends, C and D, of the second loop antenna element 114-2 are also connected to the ground plate 110. In an example implementation, the antenna positioned inside the frame 904 of the display unit 900 may have a structure and configuration similar to the structure and configuration of the antennas illustrated through FIGS. 2-8. Further, although in FIG. 9 a single antenna is shown to be positioned inside the frame 904, in an example implementation, multiple antennas may be positioned along the sides 906 and 912 of the frame 904.

Figure 10:
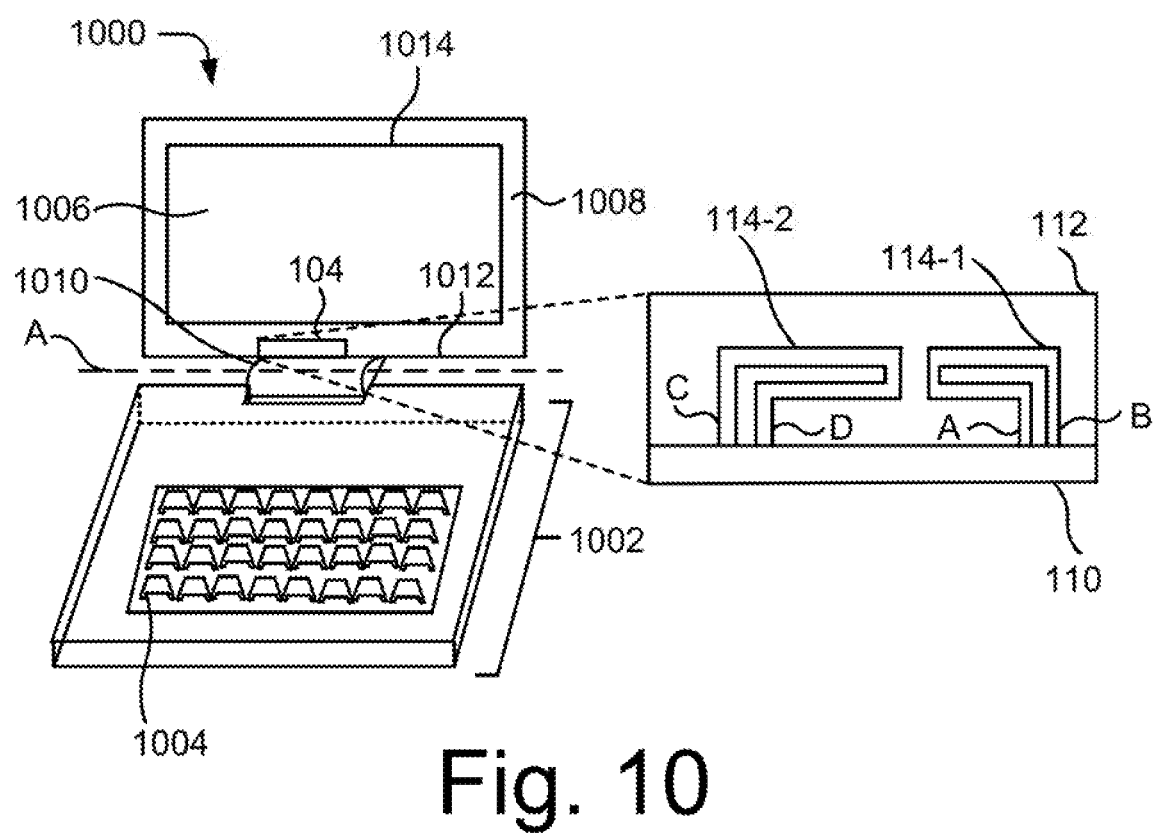
FIG. 10 illustrates an electronic device, according to an example implementation of the present subject matter.

FIG. 10 illustrates an electronic device 1000, according to an example implementation of the present subject matter. The electronic device 1000 includes a base unit 1002. The base unit 1002 houses a keyboard 1004. Other electronic components, such as, a processor, a memory, a power source, etc., can be mounted inside the base unit 1002. Examples of the electronic device 1000 include a laptop, a tablet, a notebook-tablet convertible, a smart phone, or the like.

The electronic device 1000 includes a display panel 1006, such as an LCD panel or an LED panel for rendering visual output. The electronic device 1000 also includes a frame 1008 encasing the display panel 1006. The frame 1008 may be similar to the frame 100 as illustrated in FIG. 1. The frame 1008 is coupled to the base unit 1002 through a coupling element 1010. In an example implementation, the coupling element 1010 may be a hinge. The coupling element 1010 facilitates movement of the display panel 1006 relative to the base unit 1002 about an axis of rotation A of the coupling element 1010.

As shown in FIG. 10, the electronic device 1000 includes the antenna 104, as illustrated in FIG. 1, positioned along an edge 1012 of the frame 1008 encasing the display panel 1006. The edge 1012 is substantially parallel to the axis of rotation A of the coupling element 1010. Although in FIG. 10, the antenna 104 is shown to be positioned along the edge 1012 of the frame 1008, in an example implementation, the antenna may be positioned along an edge 1014, opposite to the edge 1012, of the frame 1008. The antenna 104 may be fastened to the frame 1008 along the edge 1014 by use of adhesives or mechanical fasteners, such as screws (not shown).

The antenna 104 includes a ground plate 110 formed at the edge 1014 of the frame 1008. The antenna 104 also includes a substrate 112 positioned on the ground plate 110, a first loop antenna element 114-1 and a second loop antenna element 114-2 formed on the substrate 112, as illustrated in FIG. 1.

In an example implementation, the antenna 104 positioned inside the frame 1008 may have a structure and configuration similar to the structure and configuration of the antennas illustrated through FIGS. 2-8. Further, although in FIG. 10 a single antenna is shown to be positioned inside the frame 1008, in an example implementation, multiple antennas may be positioned along the edges 1012 and 1014 of the frame 1008.

Although implementations of frames for display panels of electronic devices, display units, and electronic devices having such frames are described in language specific to methods and/or structural features, it is to be understood that the present subject matter is not limited to the specific methods or features described. Rather, the methods and specific features are disclosed and explained as example implementations of frames for display panels of electronic devices, display units, and electronic devices having such frames.

We claim:

1. A frame for a display panel of an electronic device, comprising:
    an antenna positioned, inside the frame, along a side of the frame, wherein the side is one of a first side through which the frame is couplable to a base unit of the electronic device and a second side opposite to the first side, the antenna comprising:
        a ground plate extending along the side of the frame;
        a substrate positioned on the ground plate; and
        two loop antenna elements formed on the substrate, both ends of each of the two loop antenna elements being connected to the ground plate, the two loop antenna elements having multiple strip segments extending in different directions.

2. The frame as claimed in claim 1, wherein the antenna comprises a feeding monopole formed on the substrate between the two loop antenna elements.

3. The frame as claimed in claim 2, wherein ends of a first loop antenna element, of the two loop antenna elements, are connected to the ground plate on one side of the feeding monopole, and ends of a second loop antenna element, of the two loop antenna elements, are connected to the ground plate on another side of the feeding monopole.

4. The frame as claimed in claim 2, wherein the antenna comprises a first parasitic monopole formed on the substrate, the first parasitic monopole having an end connected to the ground plate, between the feeding monopole and one of the two loop antenna elements, wherein the first parasitic monopole extends in a direction away from the feeding monopole and towards ends of the one of the two loop antenna elements.

5. The frame as claimed in claim 4, wherein the antenna comprises a second parasitic monopole formed on the substrate, the second parasitic monopole having an end connected to the ground plate, between the feeding monopole and the other of the two loop antenna elements, wherein the second parasitic monopole extends in a direction away from the feeding monopole and towards ends of the other of the two loop antenna elements.

6. The frame as claimed in claim 2, wherein the antenna comprises a first parasitic monopole formed on the substrate, the first parasitic monopole having an end connected to the ground plate, between the feeding monopole and one of the two loop antenna elements, wherein the first parasitic monopole extends in a direction away from ends of the one of the two loop antenna elements and towards the feeding monopole.

7. The frame as claimed in claim 6, wherein the antenna comprises a second parasitic monopole formed on the substrate, the second parasitic monopole having an end connected to the ground plate, between the feeding monopole and the other of the two loop antenna elements, wherein the second parasitic monopole extends in a direction away from ends of the other of the two loop antenna elements and towards the feeding monopole.

8. A display unit of an electronic device, comprising:
a display panel;
a frame bordering the display panel;
an antenna positioned, inside the frame, along a side of the frame, wherein the side is one of a first side through which the frame is couplable to a base unit of the electronic device and a second side opposite to the first side, the antenna comprising:
 a ground plate extending along the side;
 a substrate positioned on the ground plate, the substrate having an excitation surface facing the side, such that radiations from the excitation surface are emitted out through a front surface of the side;
 a first loop antenna element formed on the excitation surface of the substrate, the first loop antenna element having multiple strip segments extending in different directions, two ends of the first loop antenna element connected to the ground plate; and
 a second loop antenna element formed on the excitation surface of the substrate, the second loop antenna element having multiple strip segments extending in different directions, two ends of the second loop antenna element connected to the ground plate.

9. The display unit as claimed in claim 8, wherein the antenna comprises a feeding monopole formed on the excitation surface of the substrate between the first loop antenna element and the second loop antenna element.

10. The display unit as claimed in claim 9, wherein the antenna comprises a first parasitic monopole formed on the substrate, the first parasitic monopole having an end connected to the ground plate, between the feeding monopole and the first loop antenna element, wherein the first parasitic monopole extends in a direction away from the feeding monopole and towards the two ends of the first loop antenna element.

11. The display unit as claimed in claim 10, wherein the antenna comprises a second parasitic monopole formed on the substrate, the second parasitic monopole having an end connected to the ground plate, between the feeding monopole and the second loop antenna element, wherein the second parasitic monopole extends in a direction away from the feeding monopole and towards the two ends of the second loop antenna element.

12. The display unit as claimed in claim 9, wherein the antenna comprises a first parasitic monopole formed on the substrate, the first parasitic monopole having an end connected to the ground plate, between the feeding monopole and the first loop antenna element, wherein the first parasitic monopole extends in a direction away from the two ends of the first loop antenna element and towards the feeding monopole.

13. The display unit as claimed in claim 12, wherein the antenna comprises a second parasitic monopole formed on the substrate, the second parasitic monopole having an end connected to the ground plate, between the feeding monopole and the second loop antenna element, wherein the second parasitic monopole extends in a direction away from the two ends of the second loop antenna element and towards the feeding monopole.

14. An electronic device comprising:
a base unit for housing a keyboard;
a display panel;
a frame encasing the display panel, wherein the frame is coupled to the base unit through a coupling element; and
an antenna positioned, inside the frame, along an edge of the frame, the edge being parallel to an axis of rotation of the coupling element, the antenna comprising:
 a ground plate formed at the edge of the frame;
 a substrate positioned on the ground plate;
 a first loop antenna element formed on the substrate, the first loop antenna element having multiple strip segments extending in different directions, two ends of the first loop antenna element connected to the ground plate; and
 a second loop antenna element formed on the substrate, the second loop antenna element having multiple strip segments extending in different directions, two ends of the second loop antenna element connected to the ground plate.

15. The electronic device as claimed in claim 14, wherein the antenna comprises a feeding monopole formed on the substrate between the first loop antenna element and the second loop antenna element, wherein the two ends of the first loop antenna element is grounded on one side of the feeding monopole and the two ends of the second loop antenna element is grounded on the other side of the feeding monopole.

* * * * *